United States Patent [19]

Drexel et al.

[11] Patent Number: 5,044,199
[45] Date of Patent: Sep. 3, 1991

[54] FLOWMETER

[75] Inventors: Charles F. Drexel, Rolling Hills, Calif.; Daniel T. Mudd, St. Charles, Mo.

[73] Assignee: DXL International, Inc., Torrance, Calif.

[21] Appl. No.: 437,053

[22] Filed: Nov. 13, 1989

[51] Int. Cl.⁵ .............................................. G01F 5/00
[52] U.S. Cl. .................................. 73/202; 137/561 A
[58] Field of Search ................... 73/3, 202, 202.5, 203; 137/561 A

[56] References Cited

U.S. PATENT DOCUMENTS

| | | | |
|---|---|---|---|
| 3,381,531 | 5/1968 | Nutjunav et al. | 73/202 |
| 3,688,576 | 9/1972 | Obermaier et al. | 73/202 |
| 3,769,835 | 11/1973 | Obermaier et al. | 73/202 |
| 3,792,609 | 2/1974 | Blair et al. | |
| 3,851,526 | 12/1974 | Drexel | 73/202 |
| 4,524,616 | 1/1985 | Drexel | 73/203 |
| 4,654,052 | 3/1987 | Sharp | 210/656 X |
| 4,662,391 | 5/1987 | Tolley | 137/393 |

FOREIGN PATENT DOCUMENTS

| | | | |
|---|---|---|---|
| 177963 | 11/1903 | Fed. Rep. of Germany | 73/202 |
| 1396849 | 3/1965 | France | 73/202 |
| 304442 | 7/1971 | U.S.S.R. | 73/202 |
| 1118858 | 10/1984 | U.S.S.R. | 73/202 |

OTHER PUBLICATIONS

H. Schichting, "Boundary Layer Theory", pp. 90—93 McGraw-Hill, New York, N.Y., pub. by Mar. 1990.
K. Millsaps & K. Pohlhausen, "Thermal Distribution in Jeffery-Hamel Flows between Nonparallel Plane Walls," Jour. Aero. Sci. vol. 20, pp. 187-196 (Mar. 1953).
H. Blausius, "Laminare Stromung in Kanalen Wechselnder Breie. Z. Math. u. Physik", vol. 58, (1910), pp. 225-233.
M. Abromowitz, "On Backflow of a Viscous Fluid in A Diverging Channel" Jour. Math. Phys., vol. 28, pp. 1-21 (1949).

Primary Examiner—Tom Noland
Attorney, Agent, or Firm—Nilsson, Robbins, Dalgarn, Berliner, Carson & Wurst

[57] ABSTRACT

A flowmeter has an elongated housing with a fluid inlet, a fluid outlet and an axial passage therebetween. The fluid passage contains a flow splitter section and is connected to a flow sensor assembly. The flow splitter section is formed by a surface defining a longitudinal fluid path and a flow splitter secured in the fluid path, so as to form an annular gap between the surface of the fluid path and the flow splitter. The surface of the fluid path defines a tapered calibration bore. The flow splitter has a tapered calibration section comprising the upstream portion of the flow splitter and at least one tapered expansion section comprising the downstream portion of the flow splitter. The taper of the calibration section is substantially parallel to the taper of the calibration bore, and the taper of the expansion section diverges away from the taper of the calibration bore.

63 Claims, 7 Drawing Sheets

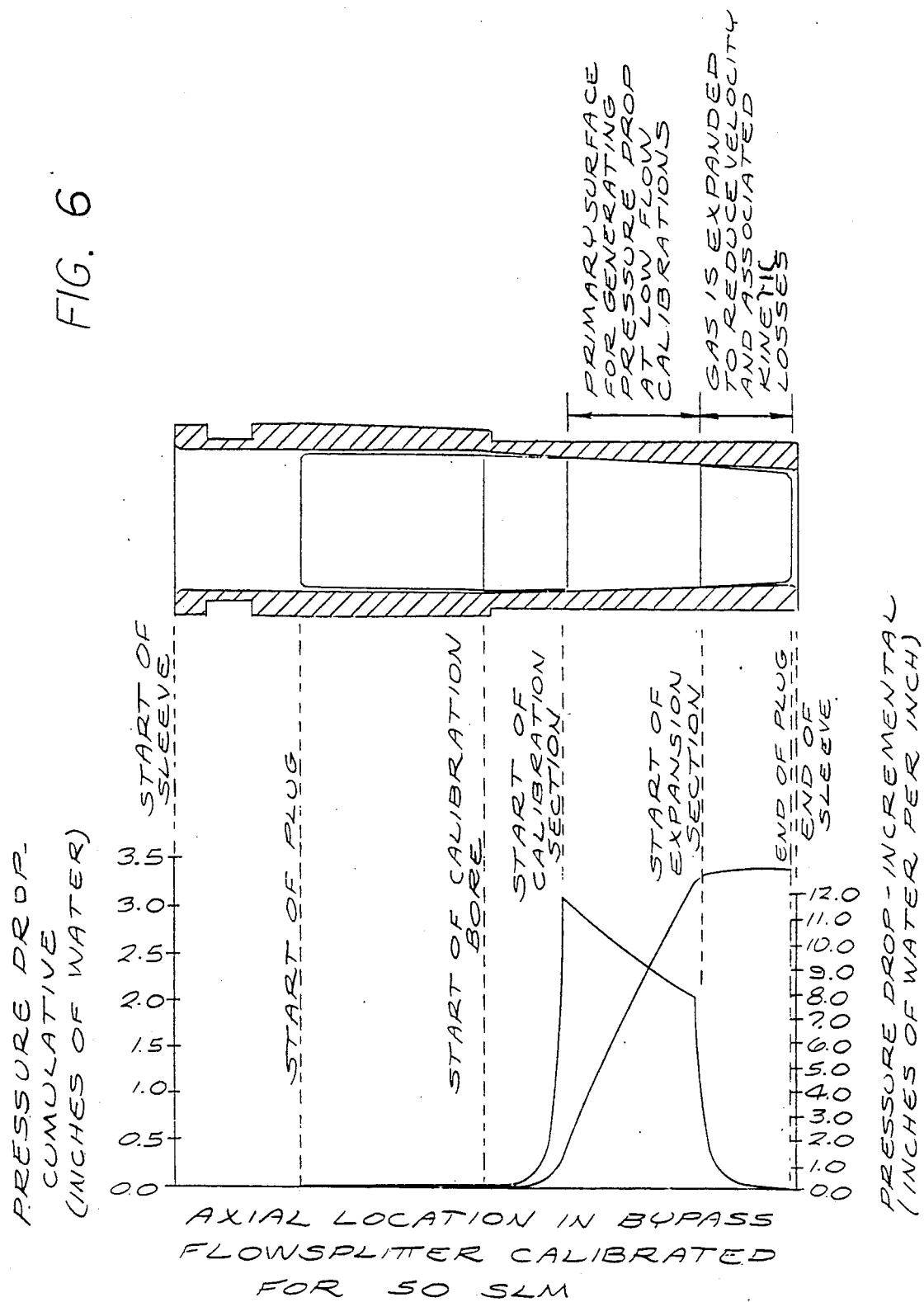

FIG. 7a
FIG. 7b
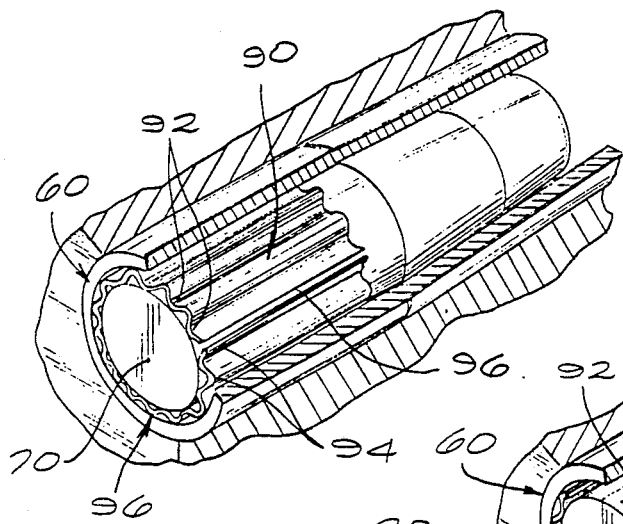
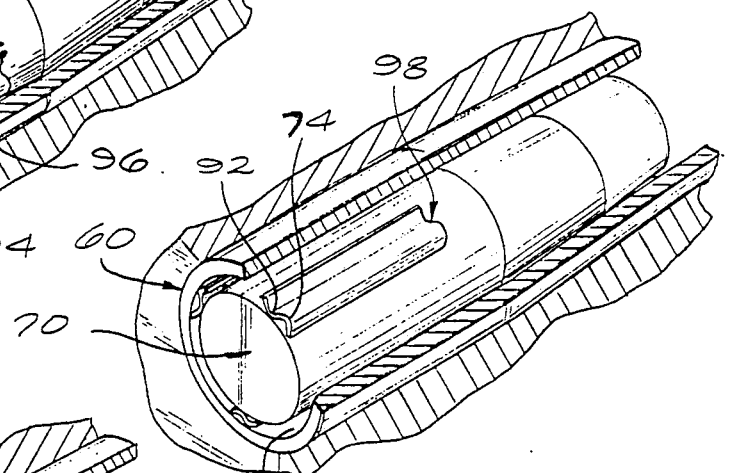
FIG. 7c
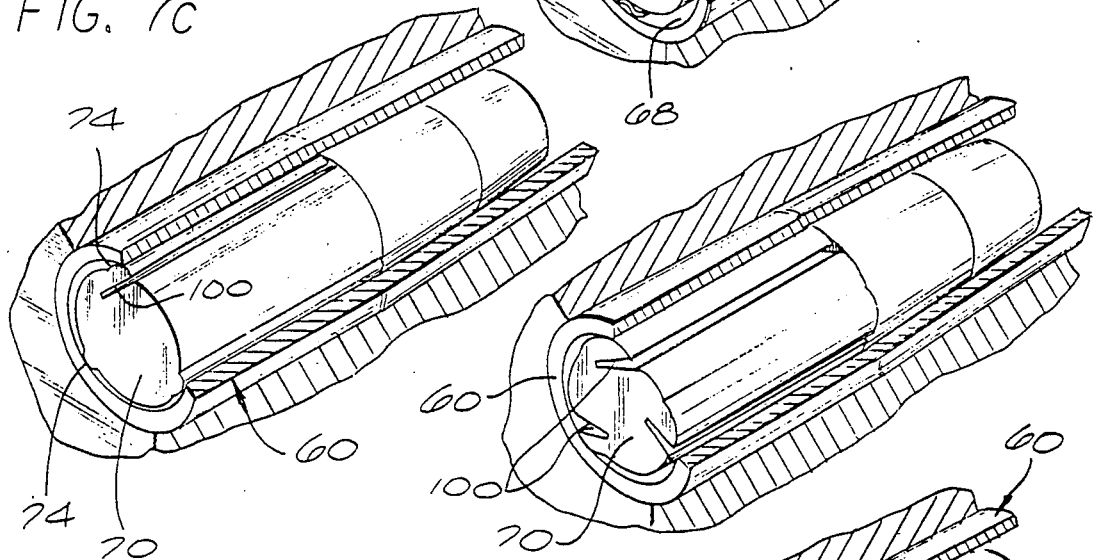
FIG. 7d
FIG. 7e
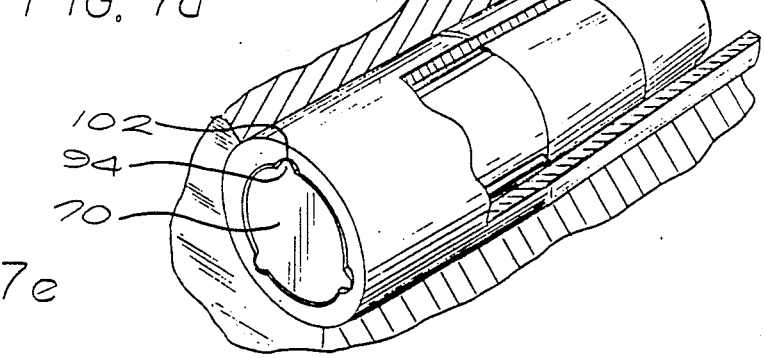

FIG. 8b
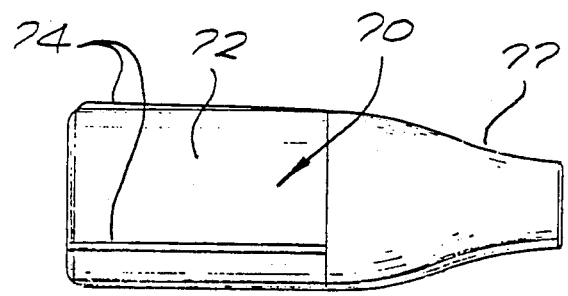
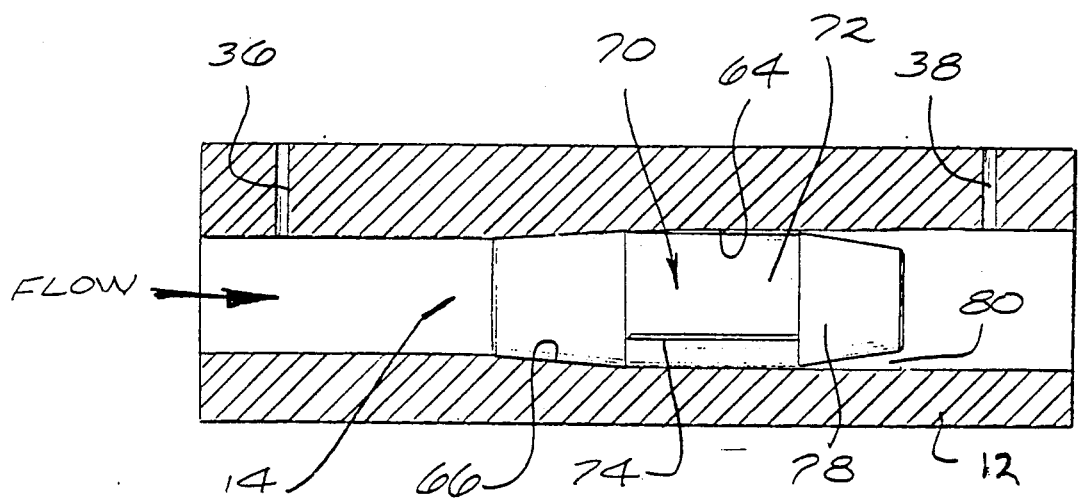
FIG. 10
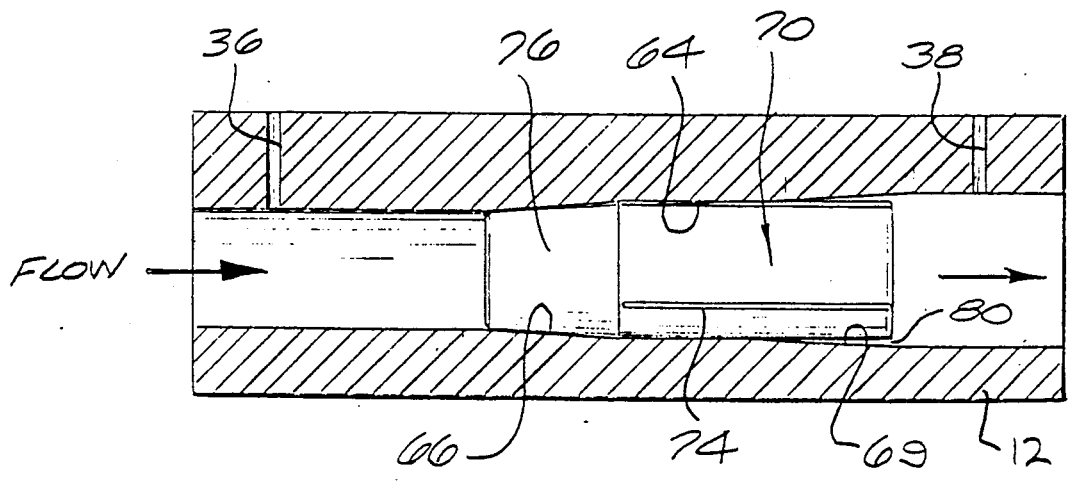
FIG. 11

FLOWMETER

BACKGROUND OF THE INVENTION

1. Field of the Invention

This invention relates to the mechanical arts. In particular, it relates to instruments for measuring the flow of fluids, such as gases.

2. Discussion of Relevant Art

The control of the mass flow of gases is important in many industries. During the manufacture of semiconductors, for example, many of the processes require a precise reaction of two or more gases under carefully controlled conditions. Since chemical reactions occur on a molecular level, the control of mass flow is the most direct way to regulate the gases.

Not only is it important that the amount of gas be precisely controlled, but it is important that the gas be free from contamination. In the manufacture of semiconductor devices having features the size of only one micron or less, the presence of any foreign contaminants in the gas stream is extremely undesirable. Particles, vapors and contaminant gases, such as dust, metal, lint, moisture, solvents, oil, air or other process gases can cause spoilage of the products. It is therefore important that the flow splitters used in mass flow meters neither trap such contaminants and subsequently release them to the gas stream, nor generate such contaminants during normal calibration and operation.

There have been developed in the art a variety of instruments for measuring the mass flow rate of gases from below 5 standard cubic centimeters per minute (SCCM) to more than 500,000 SCCM. The prevalent design of such instruments requires that the flow of the gas be divided into two or more paths.

In a typical instrument, a small flow is routed through a sensor assembly where the mass flow is measured, while most of the flow is routed through a flow splitter section located in parallel with the sensor assembly. The sensor assembly contains a capillary tube two with resistance thermometers wound on the outside. The resistance thermometers form two legs of an electronic bridge; the other two legs are usually fixed resistors. The bridge is carefully designed and manufactured such that the two resistors are as identical as possible in electrical and mechanical characteristics. When a voltage is applied across the bridge, current moves through each resistance thermometer causing them to self-heat. When there is no flow of gas through the capillary tube, both of the thermometers heat up identically. As gas begins to flow through the tube, the gas cools the first resistance thermometer and transfers a portion of that heat to the second one, causing it to get warmer. The temperature difference between the two thermometers is a function of mass flow.

Flow through a gap or conduit can be characterized by a non-dimensional parameter known as the Reynold's number. The meaning of Reynold's number is well known in the art and a discussion is found, inter alia, in U.S. Pat. No. 4,524,616, which patent is incorporated herein by reference. The Reynold's number for flow through a conduit can be determined using the formula:

$$R = 4 \, mPV_m/\mu$$

where P is the density of the fluid, $V_m$ is the mean velocity of the conduit, $\mu$ is the fluid viscosity and m is the hydraulic radius defined as the conduit area divided by the wetted perimeter of the conduit. The effective diameter of the conduit can be considered to be 4 m.

The Reynold's number expresses the ratio of the inertial forces to the viscous forces in the fluid. For low values of R, the flow is laminar, while for high values of R, inertial forces predominate and the flow tends to be turbulent. The Reynold's number corresponding to the transition between laminar and turbulent flow generally occurs in the range of about 1,600 to about 2,800; i.e., a Reynold's number of less than 1,600 may be assumed to enable laminar flow.

The geometry of the capillary tubes used in the sensor assemblies of flow meters is chosen to constrain flow of the fluid to the laminar region, that is, to a Reynold's number less than about 1,600. Under laminar flow conditions in the capillary tube, ignoring the effects of secondary kinetic losses and the effects of heat addition from the resistance thermometers, mass flow will be linear with respect to the pressure drop across the capillary tube.

Linearity is a desired quality in mass flow measurement and control. A linear mass flow system greatly simplifies interaction with an instrument's automatic process control systems. In addition, the ability to use a flowmeter on gases different than the gas initially used for calibration enables the user to switch from gas to gas without recalibration, and allows the user to employ a non-hazardous gas to calibrate flowmeters ultimately used on hazardous gases.

Assuming a perfectly linear mass flow sensor assembly using a capillary tube, to obtain a perfectly linear flow measurement, the capillary tube and the flow splitter section should have identical flow characteristics. If they do, the ratio between the flow through the capillary tube and the flow through the flow splitter section remains constant for different gases, temperatures, pressures and mass flow rates. As a result of this constant ratio, total flow can be determined from the measurement of the partial flow through the capillary tube.

If the ratio varies due to differences between the flow characteristics of the two paths, the sensor assembly signal must be electronically modified to compensate for the varying split ratio and to linearize its output with the total flow through, and possibly the temperature of the gas in, the flow meter section. Knowing and making modifications for a varying split ratio, although possible, complicates the measuring task and introduces varying degrees of inaccuracy due to unit to unit manufacturing variation. If the ratio varies with flow rate, the flow through the sensor assembly will not be a true measure of the total flow. The amount of error, when there is not a constant split flow ratio, increases as the ratio becomes more dependent on the flow rate.

A constant ratio can be achieved by creating conditions in which the mass flow rate through the fluid path and the sensor assembly are a linear function of the pressure drop across the fluid inlet and outlet. Given these conditions, the ratio becomes independent of the mass flow rate. Calculation of the total flow can then be accurately calculated from the measurement of the flow through the sensor assembly over the entire flow range using the formulae:

$$R = \frac{\dot{m}_B}{\dot{m}_s} = \frac{k_{B1} \cdot \Delta P}{k_{s1} \cdot \Delta P} \quad R = \frac{k_{B1}}{k_{s1}} = \text{Constant}$$

where: R=the ratio, $k_{B1}$=the linear flow restriction coefficient due to the geometry of the fluid path, $k_{s1}$=the linear flow restriction coefficient due to the geometry of the sensor, $\Delta P$=the pressure drop, $\dot{m}_b$=the mass flow rate through the fluid path and $\dot{m}_s$=the mass flow rate through the sensor.

If the mass flow through the fluid path is not linear with pressure drop, the ratio no longer simplifies as illustrated above. The gas passing through the fluid path increases in velocity at the expense of pressure as the cross sectional area of the fluid path is reduced. Therefore, it is a desideratum that, with the exception of linear viscous losses, all the energy contained in the gas velocity, a non-linear quantity, is converted back into pressure by the time the gas exits the fluid path. The portion that is not recovered is called a kinetic loss and causes the pressure drop across the fluid path to be non-linear with flow. The ratio then takes the form:

$$R = \frac{k_{B1} + f(k_{B2}, \Delta P)}{k_{s1} + f(K_{s2}, \Delta P)}$$

where: $k_{B1}$=the fluid path's linear flow restriction coefficient, $k_{s1}$=the sensor's linear flow restriction coefficient, $k_{B2}$=the fluid path's non-linear flow restriction coefficient, $k_{s2}$=the sensor's non-linear flow restriction coefficient, and $\Delta P$=the pressure drop. Since $\Delta P$ varies with flow, the ratio is not constant and, therefore, the sensor assembly output requires electronic modification.

Flow geometries through the sensor assembly and the fluid path are designed to reduce the effects of the non-linear terms on the ratio by constraining the flow conditions to the laminar region. However, disturbing the laminar flow profile of such designs will still create non-linear kinetic losses. Typical disturbances in the laminar flow profile can be caused by sudden contractions and expansions in the fluid path, such as by fluid entrance and exit transitions; by pressure increases due to rapid deceleration of the gas stream in an expanding cross section causing the localized back-flowing of gases; and by momentum changes due to sharp and/or repeated changes in the direction of the fluid flow.

U.S. Pat. No. 3,851,526 discloses a flowmeter in which a laminar flow conduit is connected in parallel to a flow splitter which has a series of disks with radial slots etched into one face. The slots have dimensions such that the gas flow is laminar. However, when these disks are stacked together and held in the flow path with a mounting nut, gas enters the nut, flows first radially outward, then axially, then radially inward and finally, flows axially again. Consequently, this design forces the gas to make four 90 degree turns. A momentum change is associated with each turn. Moreover, there is a sudden expansion as the gas exits the disks. Both factors cause kinetic losses which create non-linearity. The faying surfaces of the disks also trap contaminants (including moisture), so that purging is difficult. Another problem with this design is that the pressure drop depends on the torque of the nut and can be different each time the flow splitter is disassembled and reassembled.

U.S. Pat. No. 3,792,609 discloses a flow splitter which has an orifice followed by a series of closely-packed fine screens. This design also suffers from momentum losses as the gas zigzags its way through the screens.

U.S. Pat. No. 4,524,616 discloses a combination by-pass and sensor in which the flow splitting function is accomplished within the flow splitter section itself. It consists of a tapered flow splitter adjustably secured in a tapered bore in the flowmeter housing, so as to form an annular fluid path. Two boreholes are drilled through the housing to operationally connect the sensor to the bore. The device is adjusted by moving the flow splitter in and out on a threaded shaft. Such an adjusting mechanism contains dead spaces in its threads and shaft, which make purging difficult.

In the preferred embodiment of the device disclosed in U.S. Pat. No. 4,524,616, the boreholes are both connected to the annular region formed between the bore and the flow splitter. This embodiment is expensive to manufacture. Because of the location of the boreholes, the pressure drop through the sensor is very sensitive to the concentricity of the flow splitter in the bore, thus the flow splitter must be concentric with the bore within extremely close tolerances.

In the non-preferred embodiment of the device where the two boreholes are located on each side of the annular flow path, there occurs high kinetic losses due to the rapid reduction of static pressure, as the gas enters the annular fluid path, and rapid increase of the static pressure, as it exits. In the non-preferred embodiment where one borehole is located outside the annular flow area and the other borehole is located inside the laminar flow area, there results a non-linear manometer effect due to the markedly different gas velocities at the boreholes.

Now, there has been found a flowmeter which overcomes these disadvantages. The flowmeter in accordance with the invention includes a flow splitter section which provides excellent linearity over a wide range of flow rates for a great variety of gases. This means, for example, that the flowmeter can be calibrated with a non-toxic gas and then the performance of a toxic gas accurately computed.

The simple design of the flow splitter section in accordance with the invention can be manufactured relatively inexpensively out of stainless steel without forming any significant cracks, crevices, or faying surfaces and without any plastic or elastomeric parts. The fluid path contains a minimum amount of dead space or threads which could trap gases. Therefore, problems with contamination and difficulties in purging are minimized.

SUMMARY OF THE INVENTION

The flowmeter in accordance with this invention has an elongate housing with a fluid inlet, a fluid outlet and an axial longitudinal passage between the two. The axial passage contains a flow splitter section and is operationally connected in parallel to a flow sensor assembly which measures the rate of fluid flow.

The flow splitter section is formed by a surface defining a longitudinal fluid path and a flow splitter secured in the fluid path, so as to form an annular gap between the surface of the fluid path and the flow splitter, where the annular gap is capable of maintaining a laminar fluid flow through the flow splitter section.

The surface of the fluid path is either a portion of the surface of the axial passage or the inner surface of a sleeve secured in the axial passage. The surface defines a tapered calibration bore. The flow splitter has a tapered calibration section comprising the upstream portion of the flow splitter and at least one tapered expansion section comprising the downstream portion of the flow splitter.

The taper of the calibration section is either being substantially parallel to or diverges slightly away from the taper of the calibration bore. The calibration section and the calibration bore typically have a taper of from about 1 degree to about 5 degrees, preferably from about 2 degrees to about 4 degrees, as measured from the fluid path. The taper of the expansion section diverges away from the taper of the calibration bore by about 1 to about 10 degrees, as measured from the taper of the calibration bore.

In some embodiments, the fluid path surface defines a cylindrical bore located upstream of the calibration bore and the flow splitter has a cylindrical section located upstream of the calibration section. The surface of the cylindrical section being substantially parallel to the surface of the cylindrical bore and both being substantially parallel to the axis of the fluid path. In these embodiments, the flow splitter is adjustably secured in the fluid path between the cylindrical section and cylindrical bore. The securing means permit axial positioning of the flow splitter, so as to modify the cross-sectional area of the annular gap in the calibration and expansion regions.

BRIEF DESCRIPTION OF THE DRAWINGS

FIG. 6 is a diagram illustrating the pressure drop occurring along the length of the flow splitter section illustrated in FIG. 5, calibrated for 50 SCCM of nitrogen at STP, when the extension of the flow splitter in the fluid path is near its maximum.

FIGS. 7 a–e are perspective views, cut-away, of other embodiments of flow splitter sections in accordance with the invention.

FIG. 10 is a schematic illustration, in cross-section, of portions of a flowmeter incorporating another embodiment of a flow splitter section in accordance with the invention.

FIG. 11 is a schematic illustration, in cross-section, of portions of a flowmeter incorporating another embodiment of a flow splitter section in accordance with the invention.

DETAILED DESCRIPTION OF THE PREFERRED EMBODIMENTS

As required, details of illustrative embodiments of the invention are disclosed. However, it is to be understood that these embodiments merely exemplify the invention which may take forms different from the specific embodiments disclosed. For example, while the measuring section is described with regard to mass flow instruments, the flowmeter of the present invention may also be employed in volume flow instruments or in any instrument where it is desired to take advantage of the linear flow characteristics and cleanliness of the invention. Structural and functional details are not necessarily to be interpreted as limiting, but as a basis for the claims.

Figure 1:
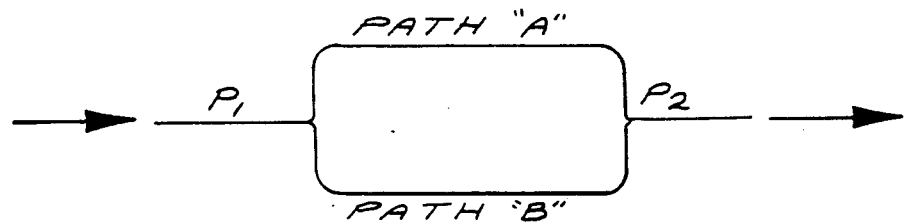
FIG. 1 is a schematic representation the flow of a fluid through a measuring section of a flowmeter.

Referring to FIG. 1, fluid paths A and B constitute the flow through a flowmeter from the inlet $P_1$ to the outlet $P_2$. The line labelled PATH A represents fluid flow through the sensor assembly of the flowmeter and the line designated PATH B represents fluid flow through the flow splitter section.

In the particular embodiments illustrated herein, PATH A depicts the fluid flow through a sensor assembly containing a capillary tube of sufficient elongation to assure laminar flow at the desired flow rate. PATH B depicts the fluid flow through a flow splitter section which is constructed and proportioned to assure laminar flow and minimize kinetic effects as hereinafter described.

Figure 2:
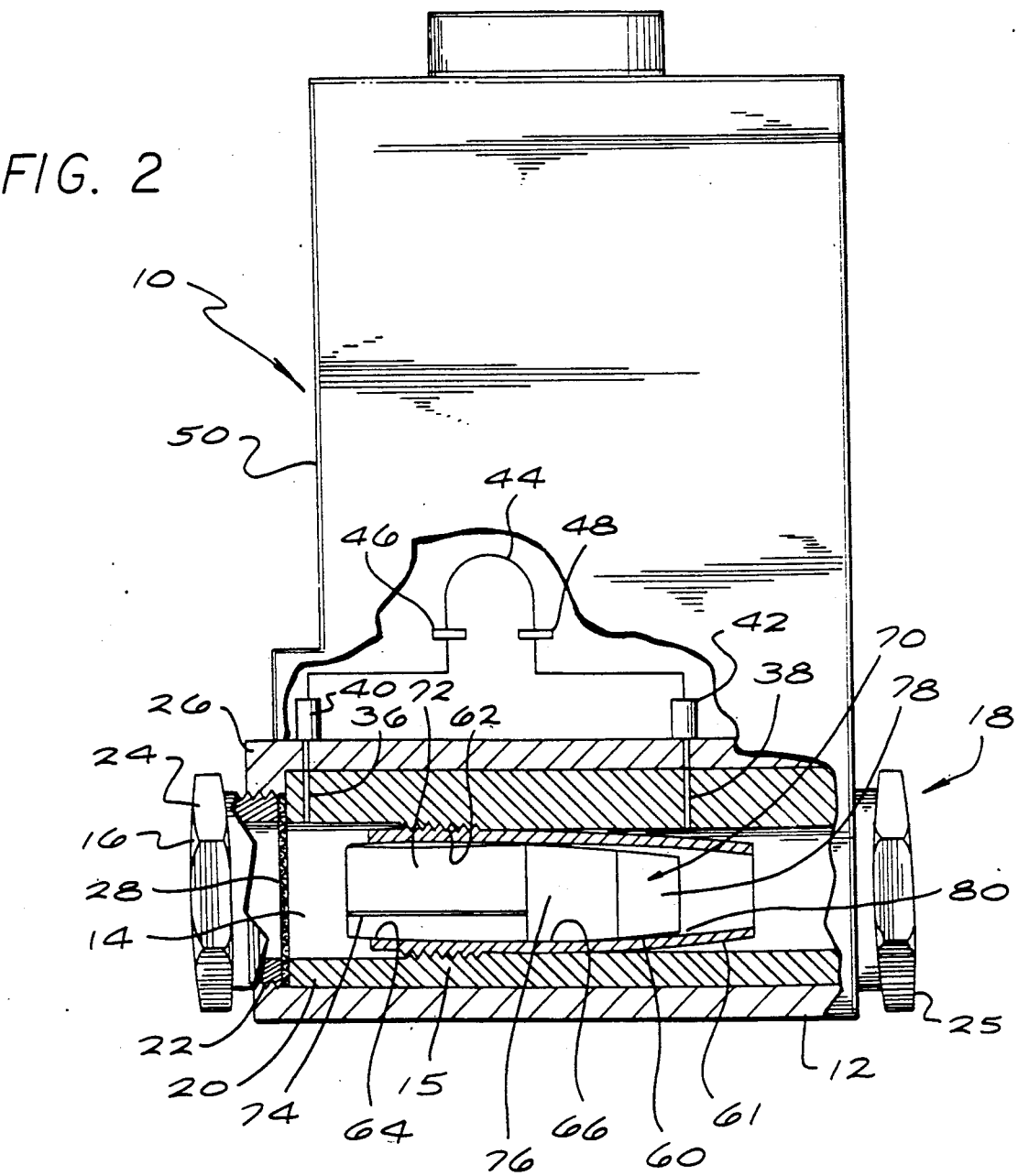
FIG. 2 is a schematic illustration, in partial cross-section, of portions of a flowmeter incorporating one embodiment of a flow splitter section in accordance with the invention.

Referring now to FIG. 2, a flowmeter 10 is illustrated incorporating a flow splitter section in accordance with the invention. The flowmeter includes a housing 12, bored to define an axial passage 14 in which is releasably secured a stationary sleeve 60 having a longitudinal fluid path therethrough. Positioned in the fluid path is an adjustable flow splitter 70. An annular gap is formed between the inner surface of the sleeve 60 and the surface of the flow splitter 70 The annular gap is capable of maintaining a laminar fluid flow throughout the fluid path.

The axial passage 14 terminates with inlet and outlet ports 16 and 18, respectively An upstream portion 20 of the axial passage 14 is seen to include internal threads 22, adapted to receive an externally threaded fitting 24 to enable the connection of the axial passage 14 with a fluid source, not shown The upstream portion 20 also includes a shoulder 26 which receives a fine mesh screen 28 which is compressively retained by the fitting 24 and protects against the influx of particulate contamination. The outlet port, includes internal threads, not shown, which matingly receive external threads on a fitting 25 which enables downstream connection of the axial passage 14.

Taps in the housing 12, in the form of a borehole 36, located upstream of the annular gap and a borehole 38, located downstream of the annular gap are provided for disposing respective attachment ends 40 and 42 of a measuring or sensor tube 44. The attachment ends 40 and 42 are tubular members through which the ends of the sensor tube 44 are tightly secured, so that fluid flowing into one end 40 is conducted entirely through the sensor tube 44 and exits through the other end 42.

An important advantage of the flowmeter in accordance with the invention is that the boreholes 36 and 38 are located in the axial passage 14 on opposite sides of the annular gap, i.e., on opposite sides of the region where the pressure drops as the fluid passes through the flow splitter section. Consequently, the gas velocity (kinetic energy content) at the location of the boreholes relative to the gas velocity (kinetic energy content) in the pressure drop region is relatively insignificant, e.g. less than 5%, when the flowmeter is calibrated for its maximum flow setting. Because the boreholes 36 and 38 are located on opposite sides of the pressure drop region, the plug 60 may be off-set without introducing localized pressure increases or decreases, at the boreholes, that would affect the linearity of the measurement.

The sensor tube 44 is very thin and elongate, and in this exemplary embodiment has an inside diameter of 0.25 mm and a length of 100 mm. The thermal elements 46 and 48 detect the mass flow rate of a fluid passing through the tube 44. The method by which this is accomplished is known in the art and need not be further described, although an advantageous fluid flow measuring system is described in U.S. Pat. No. 3,939,384. Flowmeter electronics are assembled in a second housing 50 as known in the art and which are not per se a part of the invention herein.

In the embodiment shown in FIG. 2, the axial passage 14 contains internal threads 15 adapted to receive external threads 62 on the exterior surface of the sleeve 60, so as to releasably engage the sleeve 60 in the flow passage 14.

Figure 3:
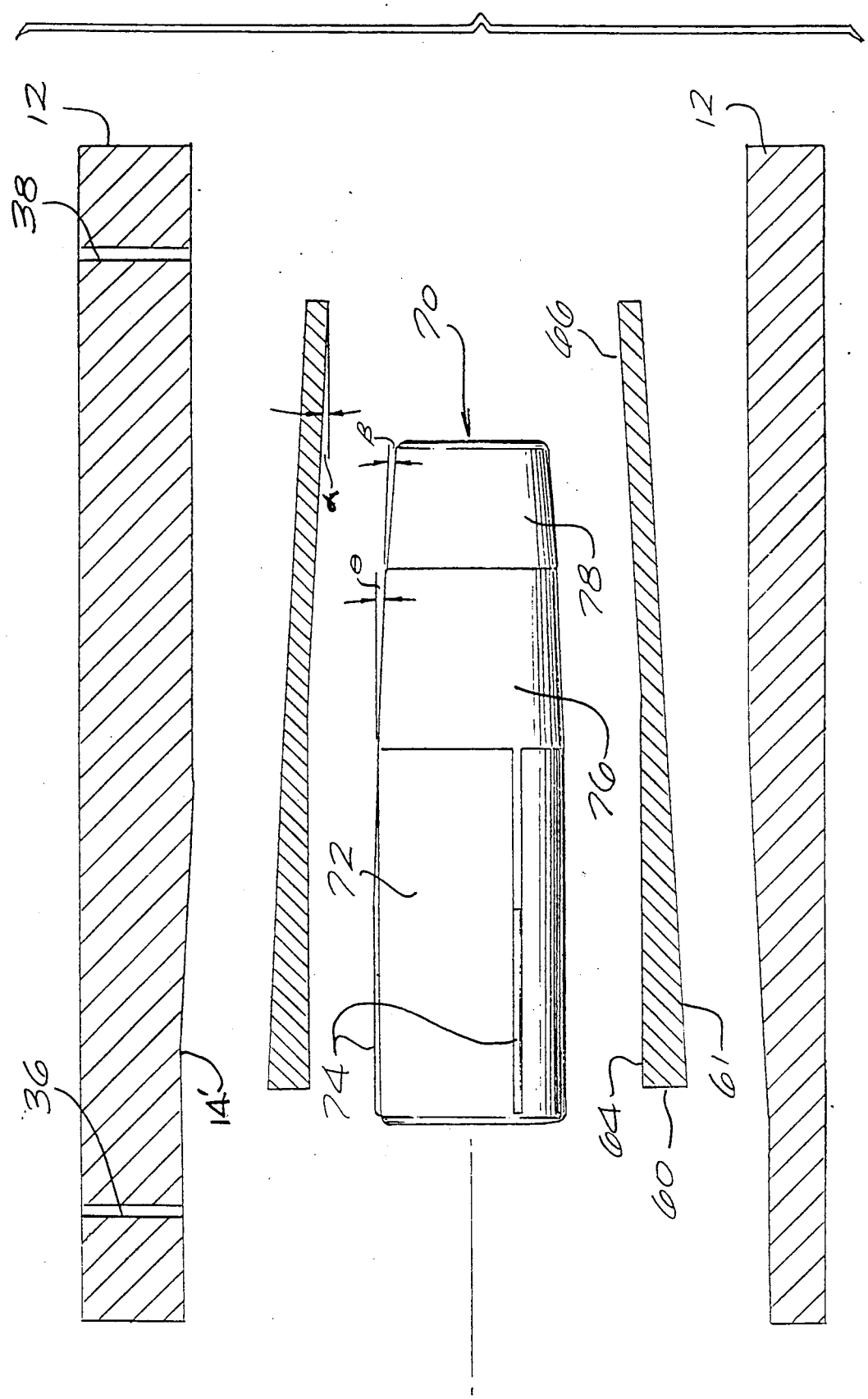
FIG. 3 is a schematic illustration, in exploded cross-section, of a portions of a flowmeter incorporating another embodiment of a flow splitter section in accordance with the invention.
Figure 4:
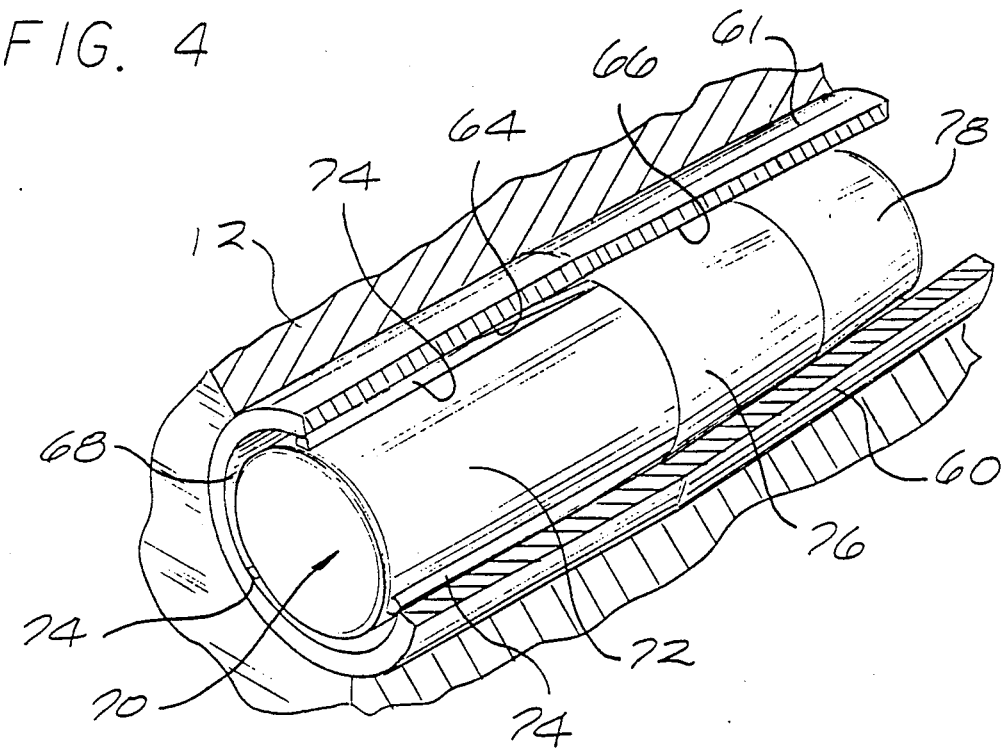
FIG. 4 is a perspective view, cut-away, of the flow splitter section shown in FIG. 3.

Referring now to FIGS. 2, 3 and 4, the upstream portion of the sleeve 60 defines a cylindrical bore 64 followed by a tapered calibration bore 66. The upstream portion of the flow splitter 70 is a cylindrical section 72 having an adjustable means for securing the flow splitter 70 in the sleeve 60. The cylindrical section 72 is followed by a calibration section 76 and then an expansion section 78.

The cylindrical portions of the sleeve and the flow splitter 64 and 72, respectively, serve two functions. First, in conjunction with securing means 74, they enable the flow splitter 70 to be adjustably positioned inside the sleeve 60.

Second, they provide the primary surface for pressure drop at high flow rates. At low and intermediate flow rates, the cross-sectional area of the annular gap 68 (FIG. 4), between the cylindrical bore 64 and the cylindrical section 72, is large compared to the cross-sectional area of the annular gap between the tapered portions and so produces relatively little pressure drop. As the flow splitter 70 is retracted to allow higher flow rates, the cross-sectional area between the tapered portions increases, thereby reducing the local flow restriction and shifting the primary restriction to the cylindrical region of the annular gap 68.

Figure 5:
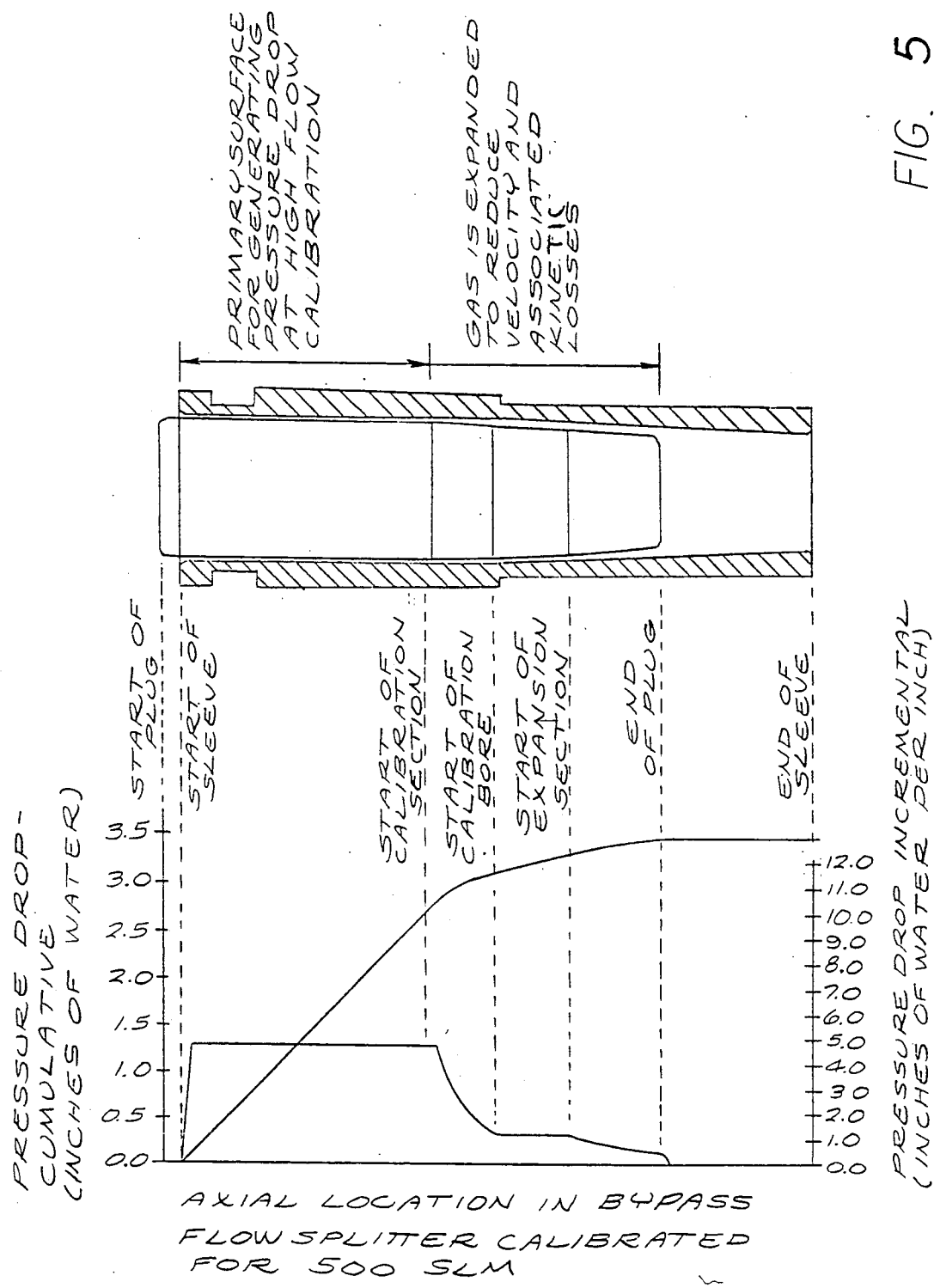
FIG. 5 is a diagram illustrating the pressure drop occurring along the length of a flow splitter section in accordance with this invention, calibrated for 5,000 SCCM of nitrogen at STP, when there is a minimum extension of the flow splitter in the sleeve.

FIG. 5 illustrates the pressure drop occurring along the length of a flow splitter section in accordance with the invention, calibrated for 5,000 SCCM of nitrogen at STP, when there is a minimum extension of the flow splitter in the sleeve. FIG. 6 illustrates the pressure drop occurring along the length of the flow splitter section illustrated in FIG. 5, calibrated for 50 SCCM of nitrogen at STP, when the extension of the flow splitter in the sleeve is near its maximum It can be seen that one of the advantages of flow splitter sections in accordance with the invention is that by having the cylindrical portion of the annular gap perform multiple functions, the range of flow rates which can be measured is significantly increased over the range measurable with conventional flowmeters.

The securing means 74 are adjustable, so that the relative position of the flow splitter 70 inside the sleeve 60 can be varied to provide varying flow rates, while providing sufficient resistance, so that the flow splitter is not moved by the pressure and frictional forces generated by the flow of the fluid during the operation of the flowmeter. It is preferred that the fit provided by the securing means 74 not be so tight that either the flow splitter 60 or the securing means are galled when the flow splitter is positioned in the fluid path. Care should be taken to avoid forming any particles by such fretting and wearing away in the flow splitter section, because such particles could form undesirable contaminants.

Referring now to FIG. 4, the securing means comprises three ears 74, which form an interference fit with the cylindrical bore 64. The ears 74 and sleeve 60 deform slightly, as the flow splitter 70 is positioned in the sleeve 60.

The ears 74 provide an adjustable means for securing the flow splitter 70, thereby allowing the cross-sectional area of the annular gap 68 to vary as the relative position of the flow splitter 70 and the sleeve 60 is varied. Importantly, this is accomplished without disrupting the laminar flow in the fluid path or introducing significant changes in momentum which arise when there are relatively large changes in the direction of the fluid flow.

The ears 74 can be machined as part of the flow splitter 70. In alternative embodiments, the ears 74 are wires affixed to the outside surface of the flow splitter 70, for example by welding, or by using balls partially embedded in the flow splitter's surface. In another embodiment, an interference fit is obtained using radial ears formed from knife edges inserted into vertical slots located on the outside of the cylindrical section. In such an embodiment, the flat knife edges are slipped into slots and then machined to form the radial ears.

In still other embodiments, the flow splitter is positioned in the sleeve using a resilient securing means, for example, by affixing hollow tubes to the surface of the flow splitter. Referring now to FIG. 7a, there is shown a flow splitter 70 secured in sleeve 60, by wrapping a stainless steel spring 90 around the circumference of the cylindrical section 72. The spring 90 is a cylinder containing axially aligned troughs 92, crests 94 and a slit 96 running the length of the cylinder. The circumference of the spring 90 at the troughs 92 is substantially the same as the circumference of the cylindrical section 72. The slit 96 permits the circumference of the spring 90 to expand as it is slipped onto the cylindrical section 72. This expansion, combined with the bending of the individual troughs 92 and crests 94, provides the resiliency of the spring. The height of the crests 94 and the stiffness of the metal is such that when the spring 90 and plug 70 are positioned in the sleeve 60, the force generated by the spring is sufficient to secure the flow splitter.

Referring now to FIG. 7b, there is shown a flow splitter 70 secured in sleeve 60 with a plurality of spring sections 98 located in the annular gap 68. Each spring section 98 contains at least one axially aligned trough 92 and at least one axially aligned crest 94. The distance between the troughs 92 and the and crests 94 and the stiffness of the metal is such that springs provide sufficient force to secure the flow splitter 70 in the sleeve 60.

Referring now to FIG. 7c, there is shown a flow splitter 70 having three ears 74 secured in sleeve 60. Under one of the ears 74, there is an axial undercut 100 forming a resilient portion in the cylindrical section 72 adjacent to the length of the surface of the ear 74 which contacts the cylindrical bore 74. The geometry of the undercut will be readily determinable by one skilled in the art without undue experimentation upon reading this specification and will be chosen so that when flow splitter 70 is positioned in sleeve 60, the force generated by the ears 74 is sufficient to secure the flow splitter, while minimizing the danger of galling.

Referring now to FIG. 7d, there is shown a flow splitter 70 having three axial undercuts 100 in the cylindrical section 72 secured in sleeve 60. Each undercut 100 forms a resilient portion in the cylindrical section 72. The resilient portions are bent away from the axis of the cylindrical section to form contact points for securing the flow splitter in the sleeve. The geometry of the undercut and the extent of the bending will be readily determinable by one skilled in the art upon reading this specification and will be chosen so that when the flow splitter 60 is positioned in the sleeve 70, the force generated by the resilient portions of the cylindrical section 72 are sufficient to secure the flow splitter.

Referring now to FIG. 7e, there is shown a flow splitter 70 having three ears 74 secured in a sleeve 60 having three axial grooves 102. The grooves 102 are located so as to securably engage the ears 74 when the flow splitter 70 is positioned in the sleeve 60. The grooves 102 are formed by coining the cylindrical bore 64, i.e., by working the surface of the cylindrical bore so as to compress selected areas to form the grooves. Coining work hardens the localized area, which minimizes the potential for galling, and provides a final sizing operation, thus permitting tighter tolerances than could otherwise be obtained.

Referring back to FIG. 3, the surface of the cylindrical section 72 is essentially parallel to the surface of the cylindrical bore 64. Both are essentially parallel to the axis of the fluid path.

The cylindrical section 72 is followed by a tapered, calibration section 76. The surface of the calibration section 76 is either substantially parallel to or diverging slightly away from the surface of the calibration bore 66. In preferred embodiments, the calibration section 76 surface slightly diverges away from the calibration bore 66 surface to partially offset the reduction in the cross sectional area of the annular gap which arises as the diameters of the calibration bore and the calibration section decrease. The divergence is typically less than about ½ degree.

The tapers of the calibration section 76 and the calibration bore 66 are generally dependent on the total length of the flow splitter section—the longer the flow splitter section, the more gradual the tapers. Given the prevalent length restrictions placed on the design of a flow splitter section, the taper of the calibration section 76 and the taper of the calibration bore 66 typically form calibration angles $\theta$ and $\alpha$ respectively, with the axis of the fluid path of from about 1 degree to about 5 degrees, preferably from about 2 degrees to about 4 degrees, and most preferably about 2.5 degrees.

The calibration portions of the sleeve and the flow splitter also serve multiple functions. First, movement of the flow splitter 70 axially within the sleeve 60 varies the cross-sectional area of the annular gap in the calibration regions and the expansion regions. (FIGS. 5 and 6). The wide range of flow rates made possible by varying the relative positions of these tapers allows a single flow splitter section to be calibrated to any mass flow setting over a wide range of values, ranging from about 10 SCCM to about 5,000 SCCM of nitrogen at STP.

Second, at high flow rates, the initial portion of the calibration section 76 provides for the beginning of an expansion zone 80 (FIGS. 2, 9 10 and 11). The purpose of the expansion zone 80 is to slow the fluid, prior to its exiting the flow splitter section, with negligible kinetic loss, so that the fluid has a velocity as close as possible to the velocity of the fluid, when it entered the flow splitter section. When calibrated for 5,000 SCCM for nitrogen at STP, as shown in FIG. 5, the calibration section 76 starts upstream of the calibration bore 66. In this region, the cross-sectional area of the annular gap 68 between the sleeve 60 and flow splitter 70 increases in the direction of the fluid flow, resulting in the beginnings of the expansion zone 80.

As discussed above, the calibration angles generally depend on the length of the flow spitter section. When, however, the inital portion of the calibration section 76 provides for the beginning of an expansion zone 80, then to minimize the back-flow of gases in the expansion zone 80 and to enhance performance at high flow rates, its calibration angle $\theta$ is selected based on the Reynold's number for the flow through that axial location.

The calibration section 76 is followed by a tapered, expansion section 78. An expansion angle $\beta$ is formed between the surface of the expansion section 78 and the surface of the calibration section 76. The expansion angle $\beta$ is governed by the Reynold's number for the fluid flow in this region of the annular gap 68—the greater the Reynold's number the smaller the expansion angle. The expansion angle is typically from about 1 degree to about 10 degrees, preferably from about 1.5 degrees to about 4 degrees and most preferably about 2 degrees. Since the taper of the expansion section 78 is greater than the taper of the calibration bore 66, the annular gap 68 becomes larger in this area and the remainder of expansion zone 80 is formed.

In addition to providing for a reduction of fluid velocity, in order to recover kinetic energy, the flow splitter sections in accordance with the invention also limit the rate of expansion of the gas in the expansion region. Limiting the rate of expansion in this region reduces the localized back-flow of gases caused by too rapid deceleration of the exiting gas.

It is an advantage of the flow splitter sections in accordance with this invention that they recover the kinetic energy of the gas stream prior to the stream's exiting the flow splitter section. The deceleration is accomplished by increasing the annular gap along the fluid path in a controlled manner. Too rapid an expansion rate will cause localized back-flow of gases resulting in kinetic loses which contribute to the non-linearity of a flow splitter section.

The phenomenon of back-flow at the wall of a divergent circular tube was addressed in (5) H. Blausius, "Laminare Stromung in Kanalen wechselnder Breite.", Z. Math. u. Physik 58 225 (1910). It has now been discovered that the condition for avoidance of back-flow in the annular expansion zone can be represented as:

$$dG/dx = 18/Nr$$

where: dG is the differential change in the annular gap between the flow splitter and the sleeve, dx is the differential change in the axial location in the fluid path and Nr is the Reynold's number at that axial location.

In practical applications, the angle of divergence can be chosen to slightly exceed 18/Nr in order to obtain additional slowing of the gas. This is beneficial when the kinetic losses associated with the slight amount of backflow in the expansion zone are more than offset by the reduction of kinetic losses associated with the lower exhaust velocities resulting from increasing the divergence angle past 18/Nr.

Figure 8A:
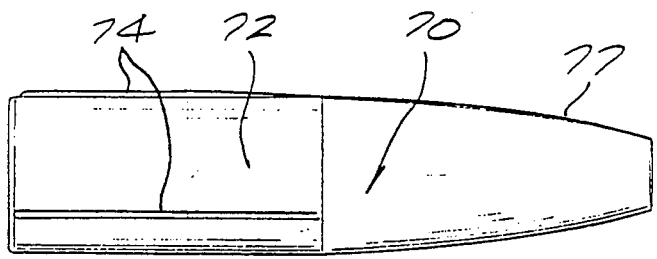
FIGS. 8a and b are a schematic illustrations, in cross-section, of a preferred embodiments of flow splitters in accordance with the invention.

For increased performance, i.e., for better linearity, the cross-sectional area of the annular gap between the flow splitter and the sleeve should change to correspond to the changing Reynold's number along the length of the annular gap. This requires continuously varying the angle of the surface. FIGS. 8a and b show preferred embodiments of flow splitters in accordance with the invention, where the surfaces of the calibration section and the expansion section 77 comprises an continuous curve. Such continuous curves can be generated by a computer and machined by numerically controlled equipment, so as to minimize kinetic losses, to a greater extent than occurs with the embodiments having just two tapers. It is also possible to make the sleeve a continuously curved surface to be used in conjunction with a flow splitter which has a curved surface, multiple tapers or a single taper.

Returning to FIG. 2, in practice, the flow splitter 70 is inserted into the sleeve 60 a short distance and then the assembly is screwed into the flow meter 10 to be calibrated. The meter 10 is placed in a calibration stand, not shown, which permits the flow splitter 70 to be further inserted while a fluid is passed through the meter. In this way, the flow splitter 70 can be precisely positioned to give the pressure drop required at the desired flow rate and with the desired fluid.

In the embodiment shown in FIGS. 3 and 4, the outer surface of the sleeve 61 is tapered, so that it can be pressed into a complimentary tapered bore 14' (FIG. 3) in the flow meter base 12. The angle of the taper of the surface 61 is generally from about ½ degree to about to about 2 degrees, preferably about 1¼ degrees to about 1½ degrees. The tapered sleeve 60 is impact-secured and impact-released from the flow meter base 12.

Figure 9:
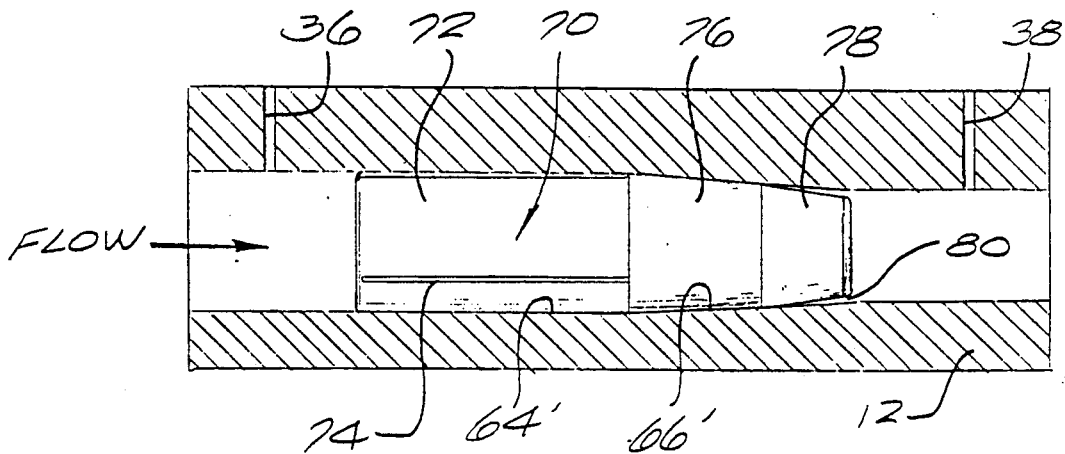
FIG. 9 is a schematic illustration, in cross-section, of portions of a flowmeter incorporating another embodiment of a flow splitter section in accordance with the invention.

In the embodiments shown in FIGS. 9, 10, and 11 the surface of the fluid path is formed from a portion of the surface of the axial passage 14 through the flowmeter housing 10 and the flow splitter 70.

The cylindrical bore be positioned upstream of the calibration bore and that the cylindrical section be positioned upstream of the calibration section. Referring now to FIG. 10, the upstream portion of the sleeve 60 contains a tapered calibration bore 66 followed by a cylindrical bore 64. The upstream portion of the flow splitter 70 is a tapered calibration section 76. The tapered calibration section 76 is followed by a cylindrical section 72, having adjustable securing means 74, and then an expansion section 78.

Referring now to FIG. 11, the upstream portion of the sleeve 60 contains a tapered calibration bore 66 followed by a cylindrical bore 64 and then an expansion bore 69. The upstream portion of the flow meter 70 is a tapered calibration section 76. The tapered calibration section 76 is followed by a cylindrical section 72, having adjustable securing means 74.

We claim and desire to protect by Letters Patent:

1. A flow splitter section in a flowmeter having an axial passage therethrough comprising
   1) a surface defining a longitudinal fluid path having a central longitudinal axis, said fluid path defining a cylindrical bore adjacent to at least one tapered calibration bore,
   2) a flow splitter adjustably secured in said fluid path, so as to form an annular gap between said fluid path surface and said flow splitter, said annular gap capable of maintaining a laminar fluid flow, said flow splitter defining a cylindrical section adjacent to at least one tapered calibration section, and the surface said cylindrical section being substantially parallel to the surface of said cylindrical bore and both being substantially parallel to the axis of said fluid path, and the taper of said calibration section at most diverging slightly away from the taper of said calibration bore and
   3) means for securing said flow splitter in said fluid path, said securing means being located in the region of said annular gap formed between the cylindrical bore surface and said cylindrical section and where said securing means enables axial adjustment of the position of said flow splitter in said fluid path.

2. A flow splitter section in accordance with claim 1, further comprising the surface of said cylindrical section contains at least three ears, where said ears form an interference fit with said cylindrical bore surface.

3. A flow splitter section in accordance with claim 2, further comprising said cylindrical bore surface contains at least three grooves which have been work hardened, where said grooves are located so as to securably engage said ears when said flow splitter is positioned in said fluid path.

4. A flow splitter section in accordance with claim 2, wherein said ears are formed from wires affixed to the surface of said cylindrical section.

5. A flow splitter section in accordance with claim 2, wherein said ears are formed from knife edges partially embedded in the surface of said cylindrical section.

6. A flow splitter section in accordance with claim 2, wherein said ears are formed from balls partially embedded in the surface of said cylindrical section.

7. A flow splitter section in accordance with claim 1, wherein said securing means is resilient.

8. A flow splitter section in accordance with claim 7, wherein said securing means comprises a spring wrapped substantially entirely around the circumference of said cylindrical section.

9. A flow splitter section in accordance with claim 8, wherein said securing means comprises a plurality of springs located in the region of said annular gap between said cylindrical bore and said cylindrical section.

10. A flow splitter section in accordance with claim 8, wherein said securing means comprises a plurality of hollow tubes located in the region of said annular gap between said cylindrical bore and said cylindrical section.

11. A flow splitter section in accordance with claim 7, further comprising the surface of said cylindrical section contains at least three axial ears and an axial undercut under at least one of said ears, where said axial undercut forms a resilient portion in said cylindrical section adjacent to the length of the surface of the ears which contains said cylindrical bore surface.

12. A flow splitter section in accordance with claim 7, further comprising at least three axial undercuts in said cylindrical section, where said undercuts each form a resilient portion in said cylindrical section and where each resilient portion is bent away from the axis of said cylindrical section to form contact points for securing said flow splitter in said fluid path.

13. A flow splitter section, in accordance with claim 1, wherein said fluid passage surface is an integral portion of the surface of said axial passage.

14. A flow splitter section in accordance with claim 1 further comprising a sleeve having inner and outer surfaces secured in said axial passage where the inner surface of said sleeve comprises said fluid path surface.

15. A flow splitter section in accordance with claim 14, further comprising said outer surface of said sleeve contains external threads adapted to releasably engage internal threads on the surface of said axial passage.

16. A flow splitter section in accordance with claim 14, further comprising said outer surface of said sleeve is tapered so as to releasably engage a complimentary tapered surface of said axial passage.

17. A flow splitter section in a flowmeter having an axial passage therethrough comprising
1) a surface defining a longitudinal fluid path having a central longitudinal axis, said fluid path defining a tapered calibration bore,
2) a flow splitter secured in said fluid path, so as to form an annular gap between said fluid path surface and said flow splitter, said annular gap capable of maintaining a laminar fluid flow,
where said flow splitter comprises a tapered calibration section, and at least one tapered expansion section, located downstream of said calibration section, the taper of said calibration section at most diverging slightly away from the taper of said calibration bore and the taper of said expansion section diverging away from the taper of said calibration bore.

18. A flow splitter section in accordance with claim 17, wherein said calibration section and said calibration bore have a taper of from about 1 degree to about 5 degrees, as measured from the axis of said fluid path, and the taper of said expansion section diverges away from the taper of said calibration bore by about 1 degree to about 10 degrees, as measured from the taper of said calibration bore.

19. A flow splitter section in accordance with claims 17 or 18, further comprising said fluid path surface defines a cylindrical bore adjacent to said calibration bore and a cylindrical section in said flow splitter adjacent to said calibration bore, the surface of said cylindrical section being substantially parallel to the surface of said cylindrical bore and both being substantially parallel to the axis of said fluid path; and means for adjustably securing said flow splitter in said fluid path, where said securing means is located in the region of said annular gap formed between the cylindrical bore surface and said cylindrical section and where said securing means enable axial adjustment of said flow splitter in said fluid path.

20. A flow splitter section in accordance with claim 19, further comprising the surface of said cylindrical section contains at least three ears, where said ears form an interference fit with said cylindrical bore surface.

21. A flow splitter section in accordance with claim 20, further comprising said cylindrical bore surface contains at least three grooves which have been work hardened, where said grooves are located so as to securably engage said ears when said flow splitter is positioned in said fluid path.

22. A flow splitter section in accordance with claim 20, wherein said ears are formed from wires affixed to the surface of said cylindrical section.

23. A flow splitter section in accordance with claim 20, wherein said ears are formed from balls partially embedded in the surface of said cylindrical section.

24. A flow splitter section in accordance with claim 20, wherein said securing means comprises a plurality of hollow tubes located in the region of said annular gap between said cylindrical bore and said cylindrical section.

25. A flow splitter section in accordance with claim 19, wherein said securing means is resilient.

26. A flow splitter section in accordance with claim 23, wherein said securing means comprises a spring wrapped substantially entirely around the circumference of said cylindrical section.

27. A flow splitter section in accordance with claim 25, wherein said securing means comprises a plurality of springs located in the region of said annular gap between said cylindrical bore and said cylindrical section.

28. A flow splitter section in accordance with claim 25, further comprising the surface of said cylindrical section contains at least three ears and an axial undercut under at least one of said ears, where said undercut forms a resilient portion in said cylindrical section adjacent to the length of the surface of the ear which contacts said cylindrical bore surface.

29. A flow splitter section in accordance with claim 25, further comprising at least three axial undercuts in said cylindrical section, where said undercuts each form a resilient portion in said cylindrical section and where each resilient portion is bent away from the axis of said cylindrical section to form contact points for securing said flow splitter in said fluid path.

30. A flow splitter section in accordance with claim 25, wherein said securing means comprises a plurality of hollow tubes located in the region of said annular gap between said cylindrical bore and said cylindrical section.

31. A flow splitter in accordance with claim 19, wherein said cylindrical bore is located upstream of said calibration bore and said cylindrical section is located upstream of said calibration section.

32. A flow splitter in accordance with claim 19, wherein said cylindrical bore is located downstream of said calibration bore and said cylindrical section is located downstream of said calibration section.

33. A flow splitter section, in accordance with claim 17 or 18, wherein said fluid passage surface is an integral portion of the surface of said axial passage.

34. A flow splitter section in accordance with claims 17 or 18 further comprising a sleeve having inner and outer surfaces secured in said axial passage where the inner surface of said sleeve comprises said fluid path surface.

35. A flow splitter section in accordance with claim 34, further comprising said outer surface of said sleeve contains external threads adapted to releasably engage internal threads on the surface of said axial passage.

36. A flow splitter section in accordance with claim 34, further comprising said outer surface of said sleeve is tapered so as to releasably engage a complimentary tapered surface of said axial passage.

37. A flow splitter section in accordance with claim 17, wherein said calibration section and said calibration bore have a taper of from about 2 degrees to about 4 degrees, as measured from the axis of the fluid path, and the taper of said expansion section diverges away from the taper of said calibration bore by about 1.5 degrees to about 4 degrees, as measured from the taper of the calibration bore.

38. A flow splitter section in accordance with claim 17, wherein said calibration section and said calibration bore have a taper of about 2.5 degrees, as measured from the axis of said fluid path, and the taper of said expansion section diverges away from the taper of said calibration bore by about 2 degrees, as measured from the taper of the calibration bore.

39. A flow splitter section in accordance with claim 17, wherein the surface of said calibration section and said expansion section form a continuous curve.

40. A flow splitter section in a flowmeter having an axial passage therethrough comprising
  1) a surface defining a longitudinal fluid path having a central longitudinal axis, said fluid path defining a tapered calibration bore and at least one tapered expansion bore, located downstream of said calibration bore,
  2) a flow splitter secured in said fluid path, so as to form an annular gap between said fluid path surface and said flow splitter, said annular gap capable of maintaining a laminar fluid flow,
  where said flow splitter comprises a tapered calibration section, the taper of said calibration section at most diverging slightly away from the taper of said calibration bore and the taper of said expansion bore diverging away from the taper of said calibration section.

41. A flow splitter section in accordance with claim 40, wherein said calibration section and said calibration bore have a taper of from about 1 degree to about 5 degrees, as measured from the axis of the fluid path, and the taper of said expansion bore diverges away from the taper of said calibration bore by about 1 degree to about 10 degrees, as measured from the taper of said calibration section.

42. A flow splitter in accordance with claims 1, 17, 18, 40 or 41, wherein the fluid is a gas.

43. A flow splitter in accordance with claims 1, 40 or 41, wherein said cylindrical bore is located upstream of said calibration bore and said cylindrical section is located upstream of said calibration section.

44. A flow splitter in accordance with claims 1, 40 or 41, wherein said cylindrical bore is located downstream of said calibration bore and said cylindrical section is located downstream of said calibration section.

45. A flow splitter section in accordance with claims 40 or 41, further comprising said fluid path surface defines a cylindrical bore adjacent to said calibration bore and a cylindrical section in said inner member adjacent to said calibration bore, the surface of said cylindrical section being substantially parallel to the surface of said cylindrical bore and both being substantially parallel to the axis of said fluid path; and means for adjustably securing said flow splitter, where said securing means are located in the region of said annular gap formed between the cylindrical bore surface and said cylindrical section and where said securing means enables axial adjustment of said flow splitter in said fluid path.

46. A flow splitter section in accordance with claim 45 further comprising the surface of said cylindrical section contains at least three ears, where said ears form an interference fit with said cylindrical bore surface.

47. A flow splitter in accordance with claim 46, further comprising said cylindrical bore surface contains at least three grooves which have been work hardened, where said grooves are located so as to securably engage said ears when said flow splitter is positioned in said fluid path.

48. A flow splitter section in accordance with claim 46, wherein said ears are formed from wires affixed to the surface of said cylindrical section.

49. A flow splitter section in accordance with claim 46, wherein said ears are formed from balls partially embedded in the surface of said cylindrical section.

50. A flow splitter section in accordance with claim 46, wherein said securing means comprises a plurality of hollow tubes located in the region of said annular gap between said cylindrical bore and said cylindrical section.

51. A flow splitter section in accordance with claim 45, wherein said securing means is resilient.

52. A flow splitter section in accordance with claim 51, wherein said securing means comprises a spring wrapped substantially entirely around the circumference of said cylindrical section.

53. A flow splitter section in accordance with claim 51, wherein said securing means comprises a plurality of springs located in the region of said annular gap between said cylindrical bore and said cylindrical section.

54. A flow splitter section in accordance with claim 41, further comprising the surface of said cylindrical section contains at least three axial ears and an undercut under at least one of said ears, where said axial undercut forms a resilient portion in said cylindrical section adjacent to the length of the surface of the ear which contacts said cylindrical bore surface.

55. A flow splitter section in accordance with claim 41, further comprising at least three axial undercuts in said cylindrical section, where said undercuts each form a resilient portion in said cylindrical section and where each resilient portion is bent away from the axis of said cylindrical section to form contact points for securing said flow splitter in said fluid path.

56. A flow splitter section in accordance with claim 51, wherein said securing means comprises a plurality of hollow tubes located in the region of said annular gap between said cylindrical bore and said cylindrical section.

57. A flow splitter section, in accordance with claims 40 or 41, wherein said fluid passage surface is an integral portion of the surface of said axial passage.

58. A flow splitter section in accordance with claims 40 or 41 further comprising a sleeve having inner and outer surfaces secured in said axial passage where the inner surface of said sleeve comprises said fluid path surface.

59. A flow splitter section in accordance with claim 58, further comprising said outer surface of said sleeve contains external threads adapted to releasably engage internal threads of the surface on said axial passage.

60. A flow splitter section in accordance with claim 47, further comprising said outer surface of said sleeve is tapered so as to releasably engage a complimentary tapered surface of said axial passage.

61. A flow splitter section in accordance with claim 40, wherein said calibration section and said calibration bore have a taper of from about 2 degrees to about 4 degrees, as measured from the axis of said fluid path, and the taper of said expansion bore diverges away from the taper of said calibration section by about 1.5 degrees to about 4 degrees, as measured from the taper of the calibration section.

62. A flow splitter section in accordance with claim 40, wherein said calibration section and said calibration bore have a taper of about 2.5 degrees, as measured from the axis of said fluid path, and the taper of said expansion bore diverges away from the taper of said cylindrical section by about 2 degrees, as measured from the taper of the calibration section.

63. A flow splitter section in accordance with claim 40, wherein the surface of said calibration bore and the surface of said expansion bore form a continuous curve.

* * * * *